April 12, 1960     F. A. LAMBERT     2,932,544
COLLAPSIBLE SUPPORT DEVICE FOR VEHICLES
Filed July 5, 1957     2 Sheets-Sheet 1
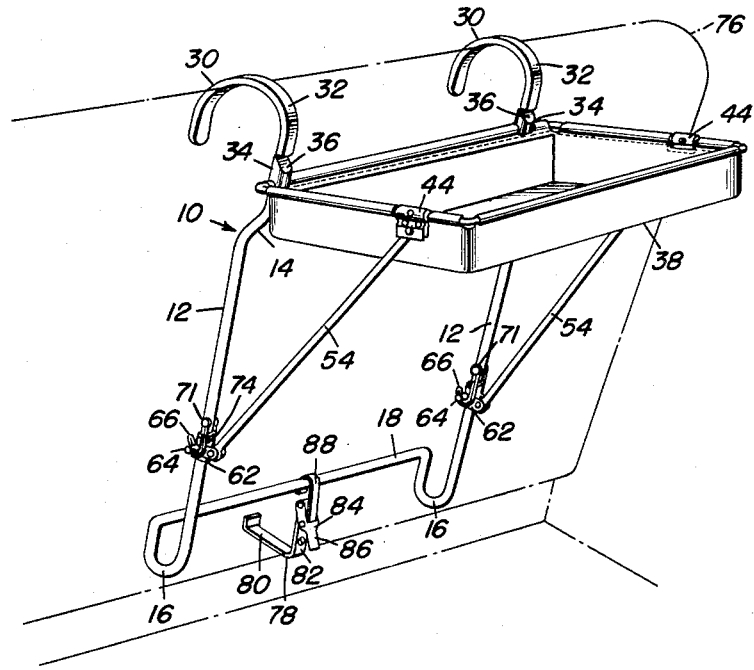
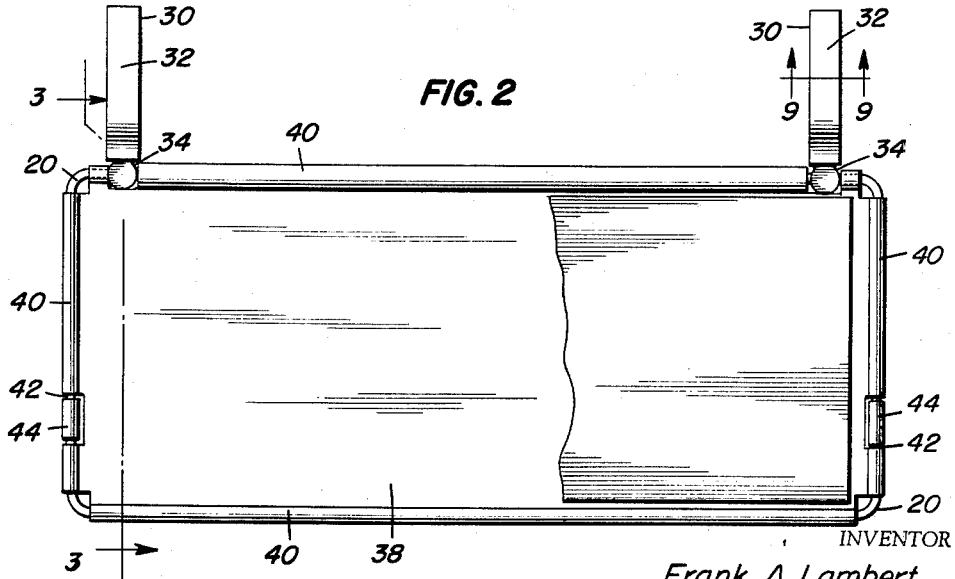
INVENTOR
Frank A. Lambert
BY
ATTORNEY

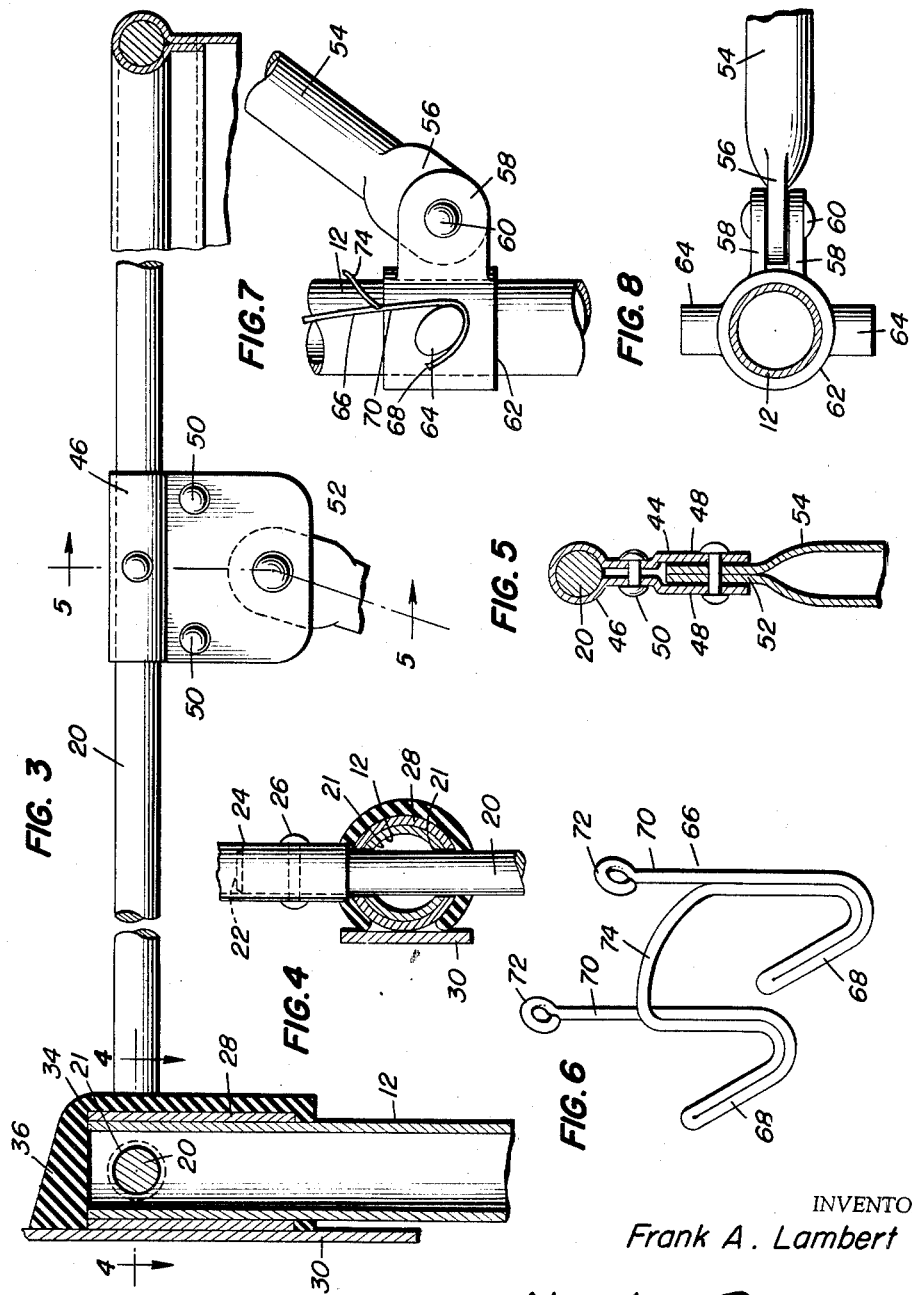

United States Patent Office 2,932,544
Patented Apr. 12, 1960

2,932,544

COLLAPSIBLE SUPPORT DEVICE FOR VEHICLES

Frank A. Lambert, Pleasanton, Calif.

Application July 5, 1957, Serial No. 670,186

6 Claims. (Cl. 311—21)

This invention relates to an attachment for automobiles and the like, and it particularly relates to a collapsible support or holding means adapted to be attached to the rear of the front seat.

On many auto trips, either short or long, it often happens that the front seat is overloaded with such items as purses, hats, road maps, cameras, etc. The rear seat, even if not occupied, is difficult to reach in order to obtain an article while the vehicle is in motion. There are, therefore, many instances when articles which should be close at hand to the driver or passenger in the front seat for most convenience, are not in a convenient or accessible position, necessitating either stopping the vehicle in order to walk around to the rear of the car or stretching and distorting oneself to reach the inaccessible articles while the car is in motion with consequent inconvenience and even danger.

It is one object of the present invention to provide a device which overcomes the above and other disadvantages by being adapted to be positioned in a convenient and easily accessible place to support or hold various types of articles.

Another object of the present invention is to provide a support device of the above type which is simple in construction and easy to handle as well as to attach and detach.

Other objects of the present invention are to provide an improved support device, of the character described, that is easily and economically produced, which is strudy in construction and which is highly efficient in operation.

With the above and related objects in view, this invention consists in the details of construction and combination of parts, as will be more fully understood from the following description, when read in conjunction with the accompanying drawings in which:

Fig. 1 is a perspective view of a device embodying the present invention, the device being shown attached to the rear of an automobile seat in operative position.

Fig. 2 is a top plan view of the device of Fig. 1.

Fig. 3 is a view, partly in elevation and partly in section, taken on line 3—3 of Fig. 2.

Fig. 4 is a view, partly in elevation and partly in section, taken on line 4—4 of Fig. 3.

Fig. 5 is a sectional view taken on line 5—5 of Fig. 3.

Fig. 6 is a detailed perspective view of the latch means for one of the slidable hinges.

Fig. 7 is an enlarged, detailed side elevational view showing one of the slidable hinges.

Fig. 8 is a top plan view of the device of Fig. 7.

Fig. 9 is a sectional view taken on line 9—9 of Fig. 2.

Referring now in greater detail to the drawings wherein similar reference characters refer to similar parts, there is shown a support device, generally designated 10, which consists of a master frame having a pair of tubular rods 12, preferably made of aluminum. Each rod 12 is provided with an offset portion 14 adjacent the upper end and, at its lower end, it is bent around to form an elbow 16. Each elbow 16 is integrally connected to the other by an integral rod 18.

Each rod 12, at its upper end, is provided with a pair of transverse holes 21 through which extend the end portions of a tray support frame 20, this support frame being generally rectangular or U-shaped with three sides and rounded corners and being open between the inner ends 22 (see Fig. 4). This type of construction permits the ends 22 of the frame to be inserted into or removed from the transverse holes 21 in rods 12. A cross-rod 24, of tubular construction (see Fig. 4), fits over each end 22, in telescopic relationship, to connect these ends and complete the four-sided configuration of the support frame. A rivet or other suitable securing means 26 holds the rod ends 22 in engagement with the cross-rod 24.

A sleeve 28, having transverse holes to mate with those of the rod 12 is provided at the upper end of each rod 12. Extending upwardly from the rear portion of each sleeve 28 is a hooked hanger strap 30, the hooked portion of which is covered with a protective covering 32 of rubber or the like. Removably positioned around the sleeve 28 and over the open upper end of each tubular rod 12 is a protective cap 34, of rubber or the like, which acts to protect the fingers and other parts of the user's body from the naked, open upper end of the tube 12 and sleeve 28. The upper end of the caps 34 are downwardly-inclined, as indicated at 36 in Figs. 1 and 3.

Supported by the frame 20 is a generally rectangular tray 38 which may be constructed of canvas, nylon, plastic or any other desired material. This tray is provided with seams 40, separated by open corners, on its upper edges; these seams receiving the frame 20. An opening is provided at the opposite ends of the seamed upper edges of the tray, these openings being indicated at 42, in order to accommodate brackets 44, made of flexible metal. Each of the brackets 44 is provided with a rod receiving portion 46 and clips over the side rod of the frame 20. Depending from the portion 46 are a pair of plates 48 which are held together by rivets 50.

Connected between the plates 48 of each of the brackets 44 is the flattened upper end 52 of a tubular brace rod 54. The lower end of each brace rod is flattened at 56 and is pivotally held between a pair of ears 58 by means of a rivet 60. The ears 58 are integral with a collar 62 slidable on the corresponding rod 12. Each collar 62 is provided with a pair of oppositely-extending lugs or pins 64, as best shown in Figs. 7 and 8.

Attached to each rod 12 is a hook assembly 66 which comprises a pair of laterally-spaced hooks 68 having upstanding extensions 70 provided with eyelets 72 at their free ends. The hooks 68 are integrally connected by a bent-over portion forming a bridge member 74 therebetween. This bridge member is positioned inwardly of the extensions 70. This hook assembly is best shown in Fig. 6. Each hook assembly is pivotally attached to the corresponding rod 12 by a rivet 71 or the like passing through each eyelet 72 and through a hole in the rod 12 positioned therebetween. In this position, the bridge member 74 lies behind the rod 12 and acts as a stop to limit the pivotal movement of hook assembly.

The hook assembly of Fig. 6 coacts with the slidable collar on each rod 12 to releasably hold the brace rods 54 in bracing position as shown in Fig. 1. With the device in collapsed position, the collars 62 are lower than the hook assemblies and the tray is upended into vertical position. When the tray is to be brought into operative position, the collars are slid upwardly on their respective rods. The bridge members 74 on the hook assemblies limit the swinging movement of the hooks to a position where the lugs 64 are enabled to ride over them during the upward movement, the lugs acting to cam back the hooks during the movement. As soon as the lugs 64 pass over the hooks, the hook assemblies swing back under the action of gravity and the lugs enter the hooks and are retained thereby. When the device is to be collapsed, the collars 62 are lifted and quickly lowered by lifting the tray support frame 20 and then quickly lowering it. This lifts the collars 62 and the lugs 64, and the collars 62 cam the extensions 70 of hooks 68 to swing the hooks 68 out of the path of the lugs 64, thus permitting the collars 62 and lugs 64 to be moved downwardly quickly before the hooks 66 drop downwardly as the tray support frame 20 is pivoted quickly down to collapsed position. Thus, the hooks 68 are self-latching and self-unlatching by merely manipulating the tray support frame 20, thereby enabling an occupant of the front seat to raise or collapse the tray support frame 20.

With the device in the position of Fig. 1, with the support hooks 30 mounted over the back of the front seat 76, the cross rod 18, at the lower end of the device, bears against the rear surface of the seat back to brace the device horizontally. In order to more firmly connect the device to the seat back, an adjustable latch 78 is provided on the cross-rod 18. This latch 78 comprises a bracket having a horizontal arm 80 and a vertical arm 82 integrally connected to form a generally L-shaped device. A yoke 84 having a handle 86 is pivoted to the upper end of arm 82 and fixed to this yoke is a flexible strap 88 which is hooked over the rod 18. The bracket arm 80 is adapted to fit under the bottom edge of the seat back while the arm 82 fits against its rear surface. If the yoke 84 is pulled down, it places the strap 88 under tension and thereby holds the bottom of the tray assembly firmly against the seat.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A collapsible support device for a vehicle seat back comprising a master frame, hanger means on one end of said master frame to overhang the upper edge of a seat back, a generally rectangular tray support frame hingedly connected to said master frame, a tray supported by said support frame, a pair of brace bars pivoted to and extending from opposite sides of said support frame, a collar hingedly connected to the lower end of each brace bar, each collar being longitudinally slidable on a respective portion of said master frame, an abutment means extending laterally of each collar, a hook device pivoted on the upper end of each of said respective portions of said master frame, each hook having extension means to be engaged on the corresponding collar, and stop means on each hook to engage the corresponding portion of the master frame to limit pivotal movement of the hook in one direction, whereby said collar cams its said hook out of its path momentarily when raised and quickly lowered to release each said hook.

2. The device of claim 1 wherein said master frame comprises a pair of tubular rods integrally connected by a cross rod at one end, one of said collars being slidable on one of said tubular rods and the other of said collars being slidable on the other of said tubular rods.

3. The device of claim 2 wherein said support frame comprises two end rods and a front rod, all integrally connected, the free ends of each end rod being bent inwardly toward each other parallel with said front rod, said free ends being insertable through mating holes in corresponding tubular rods of the master frame, and a connecting rod telescopically connected with each of said free ends to lock said support frame on the master frame.

4. The device of claim 2 wherein a latch member is provided on said cross-rod, said latch member being insertable under the lower edge of an automobile seat to releasably clamp the support device thereto.

5. A collapsible support device for a vehicle seat back comprising a master frame including a pair of vertical rods arranged parallel and spaced from each other, each of said rods being integrally connected to each other by a cross-rod at their lower ends, a hook-like strap connected to each of said rods at its upper end to overhang the upper edge of a seat back, a tray support frame hingedly connected to said master frame adjacent the upper portions of said rods, a brace rod extending downwardly from opposite ends of said tray support frame and being slidable, at their lower end, on a corresponding rod of said master frame, said rods having releasable latch means to retain the ends of said brace rods in predetermined positions, said tray support frame having an open side defined by a pair of oppositely-extending loose ends, said loose ends being insertable into mating holes in said rods of the master frame, and a connecting rod telescopically connecting with each of said loose ends.

6. A collapsible support device for a vehicle seat back comprising a master frame including a pair of vertical rods arranged parallel and spaced from each other, each of said rods having an offset portion adjacent its upper end and being integrally connected to each other by a cross-rod at their lower ends, said cross-rod being offset from the planes of said rods in a direction opposite to that of their offset portions, a hook-like strap connected to each of said rods at its upper end to overhang the upper edge of a seat back, a tray support frame hingedly connected to said master frame adjacent the upper portions of said rods, a brace rod extending downwardly from opposite ends of said tray support frame and being slidable, at their lower end, on a corresponding rod of said master frame, said rods having releasable latch means to retain the ends of said brace rods in predetermined positions, said tray support frame having an open side defined by a pair of oppositely-extending loose ends, said loose ends being insertable into mating holes in said rods of the master frame, and a connecting rod telescopically connecting with each of said loose ends.

References Cited in the file of this patent

UNITED STATES PATENTS

| | | |
|---|---|---|
| 962,922 | Schryver | June 28, 1910 |
| 1,044,889 | Hyde | Nov. 19, 1912 |
| 1,383,324 | Martell | July 5, 1921 |
| 1,708,424 | McLeskey | Apr. 9, 1929 |
| 1,778,771 | Pritchard | Oct. 21, 1930 |
| 1,875,873 | Johnson | Sept. 6, 1932 |
| 2,319,499 | Geissler | May 18, 1943 |
| 2,601,686 | Roessler | July 1, 1952 |
| 2,693,400 | Erickson | Nov. 2, 1954 |